March 12, 1968  M. L. McCUNN ET AL  3,372,535

COTTON HARVESTER

Filed March 15, 1965  2 Sheets-Sheet 1

INVENTORS
MYRON L. McCUNN &
RONALD K. LEONARD
BY William A. Murray
ATTORNEY

March 12, 1968  M. L. McCUNN ET AL  3,372,535

COTTON HARVESTER

Filed March 15, 1965  2 Sheets-Sheet 2

INVENTORS
MYRON L. McCUNN &
RONALD K. LEONARD
BY William A. Murray
ATTORNEY

United States Patent Office 3,372,535
Patented Mar. 12, 1968

3,372,535
COTTON HARVESTER
Myron L. McCunn, Dallas Center, and Ronald K. Leonard, Madrid, Iowa, assignors to Deere & Company, Moline, Ill., a corporation of Delaware
Filed Mar. 15, 1965, Ser. No. 439,542
14 Claims. (Cl. 56—12)

ABSTRACT OF THE DISCLOSURE

A cotton harvester comprising a tractor portion; harvesting mechanism on opposite sides of the tractor portion for harvesting cotton; a pair of augers for each harvesting mechanism for moving the harvested cotton rearwardly; flipper blades on the rear ends of the augers for elevating cotton; a transverse auger housing extending across the tractor portion having material inlets for receiving cotton from the flippers and a central outlet; auger flight means within the housing for moving the cotton from the inlets to the outlet; conduit means having an intake end at the outlet and a remote discharge end; and blower means having a blower outlet at the intake end of the conduit means and a blower outlet opening into the conduit means at a distance from the inlet and directed toward the discharge end.

---

This invention relates to a cotton harvester. Still more particularly this invention relates to the conveying and separating means on a cotton harvester that receives cotton from the harvesting structure and moves the cotton into a container either mounted on the harvester tractor or in a trailing relation to the tractor.

It is the primary object of the present invention to provide a new and novel structure for moving material from forwardly positioned harvesting mechanisms on a tractor into and through elevating mechanism at the rear of the tractor.

Specifically it is the object of the present invention to provide a pair of harvesting row units on opposite sides of the tractor with each including a pair of fore-and-aft extending opposed augers extending from forwardly of the traction wheels rearwardly behind the traction wheels and in a converging relation from relatively widely spaced forward ends to comparatively closely spaced rearward ends. On the rear ends of the augers are provided cooperating flipper blades that drive the material upwardly. Mounted on the rear of the tractor is a transverse auger housing with inlets at the opposite transverse ends opening downwardly to the flipper elements and receiving the material being moved vertically thereby. The flippers direct the material directly into the path of transverse augers that move the material inwardly.

It is a further object of the invention to provide a blower type of discharge positioned centrally that receives the material from the transverse augers and blows it rearwardly and then upwardly to be discharged from the unit. The elevator mechanism is composed of an L-shaped conduit with a horizontal section and a vertical section, the vertical section having a discharge outlet at its upper end. The horizontal section has an inlet that receives material from the central portion of the transverse augers and further has a blower outlet that is directed horizontally toward the vertical section and operates to drive the material toward the vertical section. Positioned on the tractor and generally above the transverse auger structure is a blower with the aforesaid outlet opening into the horizontal section and a second outlet opening into the vertical section. The material leaving the transverse auger or conveyor passes into the path of the air leaving the first outlet and the material and air is driven rearwardly and toward the vertical conduit section. Adjacent the juncture of the horizontal and vertical sections is a vertically inclined and adjustable baffle that intercepts the material moving in the horizontal conduit section and deflects the cotton bolls. The greener or heavier bolls descend whereas the riper or fluffier bolls will ascend into the vertical conduit section. Beneath the baffle or deflector is a green boll collector that receives and collects the bolls descending from the baffle.

Other objects and advantages of the present invention will become apparent to those skilled in the art as the nature of the invention is better understood from the following description and as shown in the accompanying drawings.

Figure 1:
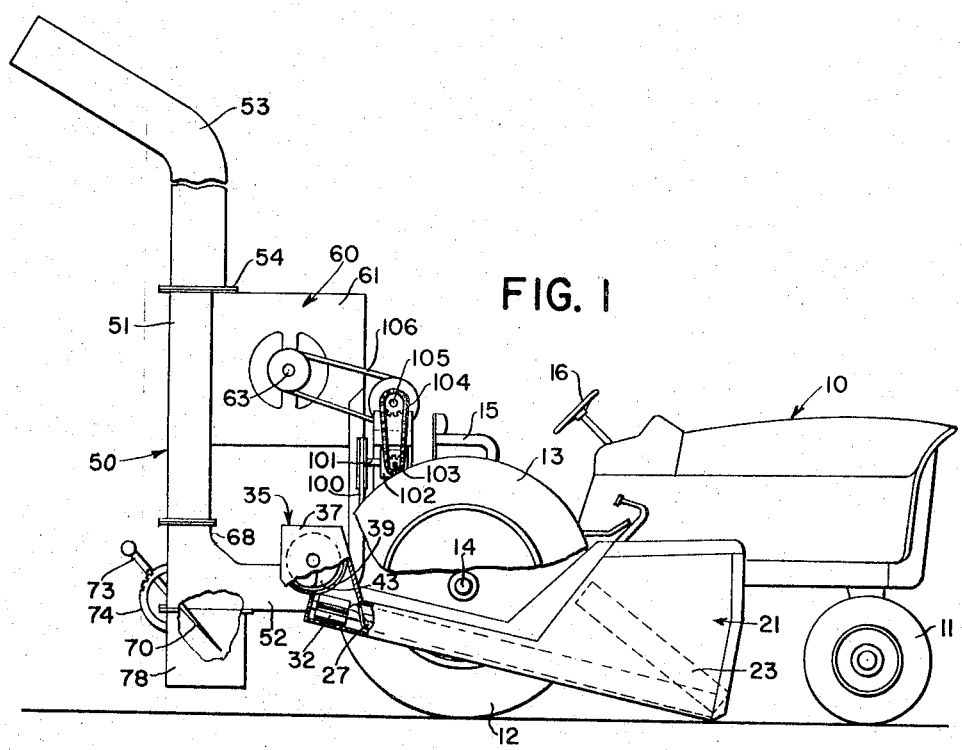
FIG. 1 is a side view of a tractor and the entire cotton harvester with portions of the latter broken away for purposes of showing internal mechanism.
Figure 2:
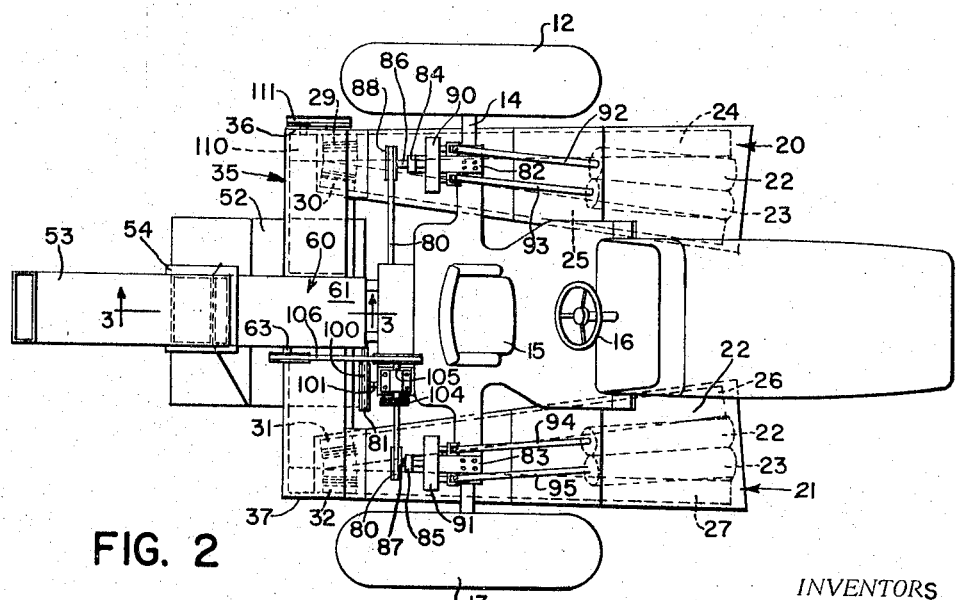
FIG. 2 is a plan view of the tractor and harvester shown in FIG. 1 with certain portions of the harvester shown in dotted representation.

The cotton harvester is supported on a tractor 10 having front steerable wheels 11 and rear traction wheels 12, 13 carried on opposite ends of a transverse axle structure 14. An operator's station, as indicated by the operator's seat 15 and steering wheel 16, is provided on the tractor.

The cotton harvester is composed of harvesting unit structures, indicated in their entirety by the reference numerals 20, 21, positioned on the left- and right-hand sides of the tractor body and forwardly of the axle structure 14. Each of the harvesting units 20, 21 includes a pair of harvesting rolls as indicated in dotted representation at 22, 23 disposed to harvest the cotton bolls from opposite sides of the plants. The rolls 22, 23 may be of a conventional type, either metal or brush type, commonly on the market at this time. Each of the harvesting units has a pair of fore-and-aft extending augers 24, 25 and 26, 27 respectively. The augers 24, 25 and 26, 27 converge from relatively widely spaced forward ends forwardly of the axle to closely adjacent rear ends rearwardly of the axle. The augers are opposed to one another and operate in conjunction with one another so that the adjacent sides move upwardly. On the rear ends are a series of flippers 29, 30 and 31, 32. The flippers 29-32 operate in conjunction with one another so as to move the cotton material upwardly.

Supported on the tractor 10 rearwardly of the axle structure 14 is a transverse housing structure 35 having opposite transverse ends 36, 37 with inlets 38, 39 opening downwardly to receive material being flipped upwardly by the respective flippers 29, 30 and 31, 32.

Figure 3:
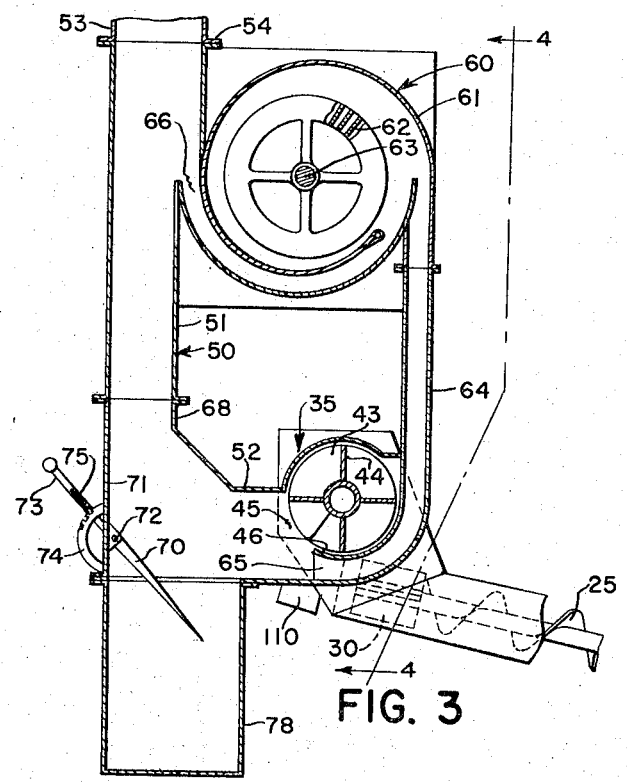
FIG. 3 is a sectional view taken substantially along the line 3—3 of FIG. 2.
Figure 4:
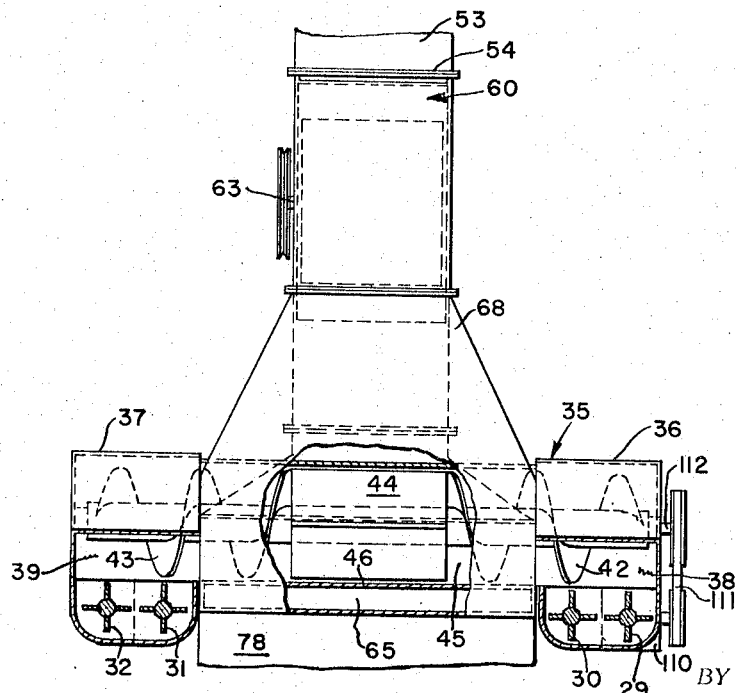
FIG. 4 is a view taken substantially along the line 4—4 as shown in FIG. 3 and with portions thereof broken away to show internal mechanism.

Supported in the transverse housing 35 is a transverse auger structure composed of outer auger flights 42, 43 extending from the outer ends 36, 37 respectively inwardly toward the fore-and-aft center line of the entire assembly. The auger flights 42, 43 are disposed to receive the material through the openings 38, 39 that is flipped upwardly by the respective flippers 29, 30 and 31, 32, and to move the material inwardly toward the center of the housing structure 35. A central transverse paddle structure that includes transverse flights 44 operates to drive the material rearwardly. Viewing FIGS. 3 and 4, it becomes apparent that the auger housing 35 has a transverse rearwardly directed opening 45 through which material contained within the housing 35 may be discharged by the flight 44. The lower portion of the housing 35 adjacent the paddle structure 44 and the inner end portions of the augers is defined by a panel 46 which is an integral part of the discharge conduit 64, to be described hereafter. The panel 46 extends slightly beyond the vertical plane of the axis of the auger structure and forms a J-trough serving to carry material inwardly to the center of the auger structure until it is flipped out and rearwardly through the opening 45.

An L-shaped conduit 50 having a vertical section 51 and a horizontal section 52 is positioned in material-receiving relation to the discharge opening 45. The vertical section 51 has at its upper end a material discharge in the form of a spout 53 that may be swiveled at 54 on the upper end of the vertical section 51 to discharge material either forwardly, rearwardly, or to the side. A blower, indicated in its entirety by the reference numeral 60, is supported on the rear end of the tractor above the transverse auger housing 35. The blower is composed of a housing 61 and a transverse horizontal blade srtucture 62 that is carried on a transverse shaft 63. The housing 61 has a downwardly projecting discharge conduit 64 terminating in a first outlet 65 and opening into the horizontal section 52 of the L-shaped conduit 50. The housing 61 has a second outlet 66 that opens into the vertical section 51 of the L-shaped housing 50 and directs air vertically upwardly in the section 51. The conduit 64 directed downwardly from the housing 61 flares outwardly to a wide lower end substantially equal in width to the discharge 65. As may be seen from viewing FIG. 3, the panel 46 is the upper side of the conduit 64 in its underlying relation to the conveyor structure 42, 43, 44. Consequently as material is moved inwardly and then rearwardly by the auger structure, it will pass directly into the area of the stream of air moving out of the discharge 65.

The horizontal section 52 of the L-shaped conduit 50 includes a corner juncture or below with a short leg portion 68 that is connected to the lower end of the vertical section 51. The transverse outer sides of the section 68 flares inwardly from a relatively wide lower end to the lower end of the relatively narrow vertical conduit section 51.

Positioned in the corner juncture is a baffle or deflector plate 70 that is supported on a rear wall 71 of the corner juncture so as to pivot or move vertically on a transverse horizontal pivot 72. The baffle member 70 has a manual control lever 73 extending rearwardly and upwardly adapted to move the member 70 about the pivot 72. A sector 74 is provided and a latch, indicated in its entirety at 75, is provided on the arm 73 so that the entire baffle member 70 may be adjusted and locked in various angular positions in the conduit 50.

Positoned beneath the baffle 70 is a green boll collector box 78. The collector box may be attached or detached and serves to collect the green or heavier bolls and heavier trash remaining in the cotton.

Power to operate the entire harvesting mechanism is received from the power take-off shaft, not shown, on the tractor and includes first and second V-belts 80, 81 suitably driven by the power take-off shaft and extending outwardly to opposite sides of the tractor body. Supported on the axle structure 14 on opposite sides of the body is a rearwardly projecting bracket structure 82, 83 having upwardly projecting portions 84, 85 that support respective fore-and-aft extending shafts 86, 87. The shafts 86, 87 are driven by pulleys 88, 89 that are driven by the respective V-belts 80, 81. The shafts 86, 87 extend into gear transmissions 90, 91 that in turn transmit power to fore-and-aft extending drive shafts 92, 93 for the left-hand row unit and 94, 95 for the right-hand row unit. The shafts 92–95 are drivingly connected to the respective augers 24, 25 and 26, 27 and to the harvesting rolls 22, 23. The exact method of driving the latter units is not important for purposes of the present invention although it should be fully appreciated they are power driven.

The drive to the blower shaft 63 is composed of a V-belt drive 100 extending between the power take-off shaft, not shown, on the tractor 10 and a jackshaft 101 supported on the tractor body rearwardly of the axle 14. The jackshaft 101 extends into a bevel gear transmission 102 terminating in an outwardly transverse extending shaft 103 having a sprocket thereon driving a chain drive 104 extending upwardly into a transverse pulley shaft 105. A V-belt drive 106 that extends between the shaft 105 and the shaft 63 operates the blower.

The invention operates in the following manner. As the entire harvester moves forwardly over the ground, the harvesting rolls 22, 23 attack the plants and drive the cotton material outwardly and into the troughs of the respective augers 24, 25 and 26, 27. The latter augers move the cotton bolls rearwardly to the flippers 29–32 which flip them upwardly into the path of the auger flightings 42, 43. The augers and the central paddle structure 44 drive the material rearwardly over the rear lip of the auger trough section 46 and through the opening 45. Both the ripe and green bolls will not be separated at this point. However, as they leave the lower lip they descend into the path of the air moving through the outlet 65 and are driven rearwardly to contact the deflecting baffle 70. The green bolls at this point gravitate out of the air stream and the riper bolls are driven with the air stream upwardly into the vertical section 51 of the L-shaped conduit 50. Further aiding the ripe cotton bolls in their ascent is the secondary blast of air that moves through the outlet 66 and into the vertical section 51. This increases the pressure in the portion of the conduit below the outlet 66 and thereby aids the ripe cotton bolls in their movement upwardly.

While only one form of the invention has been shown, it should be recognized that other forms and variations will occur to those skilled in the art without departing from the basic principle of the invention. Therefore while the preferred form is shown and described in concise and detailed manner, it should be recognized there is no intention to limit or narrow the invention beyond the broad concepts set forth in the appended claims.

What is claimed is:

1. A cotton harvester adapted for support on a tractor having a rear axle and supporting wheels carried thereon, comprising: harvesting structure supported on opposite sides of the tractor forwardly of the axle with each including a pair of opposed fore-and-aft extending augers converging rearwardly from spaced apart forward ends forwardly of the axle to closely adjacent rear ends rearwardly of the axle, the augers having adjacent sides thereof moving upwardly; flipper blades at the rear ends of and in material-receiving relation to the augers and adapted to flip material upwardly; transverse auger housing structure supported on the rear of the tractor in overlying relation to the flipper blades and having downwardly opening material intakes at opposite ends for receiving material from the flipper blades; auger means within the housing for moving material inwardly; material discharge conduit means supported on the tractor centrally of the transverse auger housing structure and having a material intake end disposed to receive material moving inwardly by the transverse auger means and extending from the intake end to an elbow and from thence to an upper remote discharge end; a blower supported on the tractor having a first blower outlet adjacent to and directed into the intake end of the conduit means for driving the material through the conduit means and a second blower outlet opening into the conduit means downstream from the first outlet; and a green boll collector box beneath the elbow for catching heavier bolls gravitating from the conduit means.

2. A cotton harvester adapted for support on a tractor having a rear axle and supporting wheels carried thereon, comprising: harvesting structure supported on opposite sides of the tractor forwardly of the axle including fore-and-aft extending augers having forward ends forwardly of the axle and rear ends rearwardly of the axle; flipper blades at the rear ends of and in material-receiving relation to the augers and adapted to flip material upwardly; transverse auger housing structure supported on the rear of the tractor in overlying relation to the flipper blades and having downwardly opening material intakes at opposite ends for receiving material from the flipper blades; auger means within the housing for moving material inwardly; material discharge conduits supported on the tractor centrally of the transverse auger housing structure and having a material intake end disposed to receive material moving inwardly by the transverse auger means and extending from the intake end to an elbow and from thence to an upper remote discharge end; blower means supported on the tractor having a first blower outlet adjacent to and directed into the intake end of the conduit means for driving the material through the conduit means and a second blower outlet opening into the conduit means downstream from the first outlet; and a green boll collector box beneath the elbow for catching heavier bolls gravitating from the conduit means.

3. A cotton harvester adapted for support on a tractor having a rear axle and supporting wheels carried thereon, comprising: harvesting structure supported on opposite sides of the tractor forwardly of the axle including fore-and-aft extending augers having forward ends forwardly of the axle and rear ends rearwardly of the axle; transverse housing structure supported on the rear of the tractor in overlying relation to the rear ends of the augers and having downwardly opening material intakes at opposite ends above the rear ends; material discharge conduit means supported on the tractor between the ends of the transverse housing structure and having a material intake end adjacent to and opening into the housing structure and extending from the intake end to an elbow and from thence to an upper remote discharge end; blower means supported on the tractor having a first blower outlet adjacent to and directed into the intake end of the conduit means for driving the material through the conduit means and a second blower outlet opening into the conduit means downstream from the first outlet; and a green boll collector box beneath the elbow for catching heavier bolls gravitating from the conduit means.

4. A cotton harvester adapted for support on a tractor having a rear axle and supporting wheels carried thereon, comprising: harvesting structure supported on opposite sides of the tractor forwardly of the axle including fore-and-aft extending augers having forward ends forwardly of the axle and rear ends rearwardly of the axle; transverse housing structure supported on the rear of the tractor in overlying relation to the rear ends of the augers and having downwardly opening material intakes at opposite ends above the rear ends; material discharge conduit means supported on the tractor between the ends of the transverse housing structure and having a material intake end adjacent to and opening into the housing structure and extending from the intake end to an upper remote discharge end; a blower supported on the tractor having a blower outlet between the intake end and outlet end and directed toward the outlet for driving the material through the conduit means; and a green boll collector box beneath the conduit means for catching heavier bolls gravitating from the material.

5. A cotton harvester adapted for support on a tractor having a rear axle and supporting wheels carried thereon, comprising: harvesting structure supported on opposite sides of the tractor forwardly of the axle with each including a pair of fore-and-aft extending augers converging rearwardly from spaced apart forward ends forwardly of the axle to closely adjacent rear ends rearwardly of the axle, the augers having adjacent sides thereof moving upwardly; flipper blades at the rear ends of and in material-receiving relation to the augers and adapted to flip material upwardly; transverse auger housing structure supported on the rear of the tractor in overlying relation to the flipper blades and having downwardly opening material intakes at opposite ends for receiving material from the flipper blades; and auger flighting within the housing above the flippers for receiving and moving material inwardly.

6. A cotton harvester adapted for support on a tractor having a rear axle and supporting wheels carried thereon, comprising: harvesting structure supported on the tractor forwardly of the axle including fore-and-aft extending auger means having forward and rear ends forwardly and rearwardly respectively of the axle; elevating means at the rear ends in material-receiving relation to the auger means and adapted to elevate material in response to rotation of the auger means; transverse housing structure supported on the rear of the tractor in overlying relation to the elevating means and having downwardly opening material intake means for receiving material from the elevating means; and conveyor flighting within the housing structure above the elevating means for receiving and moving material away from the material intake means.

7. A cotton harvester adapted for support on a tractor having a rear axle and supporting wheels carried thereon, comprising: harvesting structure supported on opposite sides of the tractor forwardly of the axle including conveying means for moving material rearwardly of the axle; transverse auger housing structure supported on the rear of the tractor having a central outlet opening rearwardly and material intakes at opposite ends for receiving material from the conveying means; auger means within the housing for moving material inwardly from the intakes, and including paddle means for driving the material rearwardly through the outlet; material discharge conduit means supported on the tractor centrally of the transverse auger housing and having a material intake end disposed to receive material moving rearwardly through the outlet and extending from the intake end to an upper remote discharge end; blower means supported on the tractor having a first blower outlet adjacent the underside of the paddle means and directed into the intake end of the conduit means for driving the material through the conduit means and a second blower outlet opening into the conduit means downstream from the first outlet; an elbow in the conduit means between the first and second outlets; and a green boll collector box beneath the elbow for catching heavier bolls gravitating from the conduit means.

8. A cotton harvester adapted for support on a tractor having a rear axle and supporting wheels carried thereon, comprising: harvesting structure supported on opposite sides of the tractor forwardly of the axle including conveying means for moving material rearwardly of the axle; transverse auger housing structure supported on the rear of the tractor having a central outlet opening rearwardly and material intakes at opposite ends for receiving material from the conveying means; auger means within the housing for moving material inwardly from the intakes, and including a paddle means for driving the material rearwardly through the outlet; material discharge conduit means supported on the tractor centrally of the transverse auger housing and having a material intake end disposed to receive material moving rearwardly through the outlet and extending from the intake end to an upper remote discharge end; blower means supported on the tractor having a first blower outlet adjacent the underside of the paddle means and directed into the intake end of the conduit means for driving the material through the conduit means and a second blower outlet opening into the conduit means downstream from the first outlet; and a green boll collector beneath the conduit means between the first and second outlets for catching heavier bolls gravitating from the material.

9. A cotton harvester adapted for support on a tractor having a rear axle and supporting wheels carried thereon, comprising: harvesting structure supported on opposite sides of the tractor forwardly of the axle including conveying means for moving material rearwardly of the axle; transverse auger housing structure supported on the rear of the tractor having a central outlet opening rearwardly and material intakes at opposite ends for receiving material from the conveying means; auger means within the housing for moving material inwardly from the intakes; central flight means for moving the material from the outlet; material discharge conduit means supported on the tractor centrally of the transverse auger housing and having a material intake end disposed to receive material moving from the flight means and extending from the intake end to an upper remote discharge end; blower means supported on the tractor having a blower outlet opening into the conduit means in spaced relation from the intake end and directed toward the remote discharge end; and a green boll collector beneath the conduit means for catching heavier bolls gravitating from the material.

10. A cotton harvester adapted for support on a tractor having a rear axle and supporting wheels carried thereon, comprising: harvesting structure supported on the tractor including conveying means for moving material to an area of discharge; transverse auger housing structure supported on the tractor having an outlet opening in a fore-and-aft direction and a material intake for receiving material from the conveying means; auger means within the housing for moving material inwardly from the intake, and including paddle means for driving the material through the outlet; material discharge conduit means supported on the tractor and having a material intake end disposed to receive material moving through the outlet and extending from the intake end to an upper remote discharge end; and blower means supported on the tractor having a blower outlet opening into the conduit means in spaced relation from the intake end and between the outlet of the housing structure and the discharge end, and directed toward the discharge end.

11. A cotton harvester adapted for support on a traction vehicle comprising: harvesting structure on the vehicle; conveyor housing structure supported on the traction vehicle having a material inlet for receiving material from the harvesting structure and a discharge area; conveying means within the housing structure for moving material from the inlet to the discharge area; material discharge conduit means supported on the traction vehicle in continuing relation to the housing structure and having a material intake end in communication with the discharge area of the housing structure so as to receive material therefrom and extending from the intake end to an upper remote discharge end; and blower means supported on the vehicle having a blower outlet opening into the conduit means in spaced relation from the intake end and between the outlet of the housing structure and the discharge end, and directed toward the discharge end.

12. A cotton harvester supported on a traction vehicle comprising: harvesting structure on the vehicle for harvesting cotton and moving it to an area of discharge; conveyor housing structure supported on the vehicle having a material inlet for receiving material at the area of discharge and a material outlet end; material discharge conduit means supported on the vehicle and having a material intake end at the outlet for receiving material therefrom and extending from the intake end to a remote discharge end; mechanical conveyor means within the conveyor housing for moving material from the inlet to the outlet for discharge into the intake end of the conduit means; and blower means supported on the vehicle having a blower outlet at the intake end and a blower outlet opening into the conduit means in spaced relation from the intake end and between the intake end and discharge end, and directed toward the discharge end.

13. A cotton harvester aapted for support on a tractor having a rear axle and supporting wheels carried thereon, comprising: harvesting structure supported on the tractor including conveying means for moving material to an area of discharge; transverse auger housing structure supported on the tractor having an outlet opening in a fore-and-aft direction and a material intake for receiving material from the conveying means; auger means within the housing for moving material inwardly from the intake; flight means for moving the material from the outlet; material discharge conduit means supported on the tractor and having a material intake end disposed to receive material moving from the outlet and extending from the intake end to an upper remote discharge end; and blower means supported on the tractor having a blower outlet opening into the conduit means in spaced relation from the intake end and between the intake end and the discharge end, and directed toward the discharge end.

14. The structure as set forth in claim 10 further characterized by a second blower outlet at the intake end of the conduit means and closely adjacent the outlet for driving material leaving the outlet toward the discharge end of the conduit means.

References Cited

UNITED STATES PATENTS

| | | | |
|---|---|---|---|
| 2,445,162 | 7/1948 | Wallace | 56—34 |
| 2,654,201 | 10/1953 | Hyman | 56—33 X |
| 2,673,438 | 3/1954 | Miller et al. | 56—30 |
| 2,741,888 | 4/1956 | Hamel et al. | 56—12 |
| 2,825,195 | 3/1958 | Smith | 56—14 |

ANTONIO F. GUIDA, *Primary Examiner.*

ABRAHAM G. STONE, RUSSELL R. KINSEY,
*Examiners.*